(12) United States Patent
Zhang

(10) Patent No.: US 10,520,526 B2
(45) Date of Patent: Dec. 31, 2019

(54) FOLDED TETHER STRUCTURE FOR MEMS SENSOR DEVICES

(71) Applicant: Analog Devices, Inc., Norwood, MA (US)

(72) Inventor: Jianglong Zhang, Vienna, VA (US)

(73) Assignee: Analog Devices, Inc., Norwood, MA (US)

( * ) Notice: Subject to any disclaimer, the term of this patent is extended or adjusted under 35 U.S.C. 154(b) by 421 days.

(21) Appl. No.: 15/290,991

(22) Filed: Oct. 11, 2016

(65) Prior Publication Data

US 2018/0100874 A1  Apr. 12, 2018

(51) Int. Cl.
*G01P 15/097* (2006.01)
*G01P 15/08* (2006.01)

(52) U.S. Cl.
CPC .... *G01P 15/097* (2013.01); *G01P 2015/0871* (2013.01)

(58) Field of Classification Search
CPC ........... G01P 15/097; G01P 2015/0871; G01P 2015/0805; G01P 2015/0857; G01P 2015/0862
See application file for complete search history.

(56) References Cited

U.S. PATENT DOCUMENTS

| 8,165,323 | B2 | 4/2012 | Zhou |
| 8,446,078 | B2 | 5/2013 | Gaidarzhy et al. |
| 8,555,719 | B2 | 10/2013 | McNeil et al. |
| 9,299,910 | B1 | 3/2016 | Sparks et al. |
| 2008/0000297 | A1* | 1/2008 | Koury ................... B81B 3/0094 73/514.32 |
| 2010/0186508 | A1* | 7/2010 | Guenther ............... G01C 25/00 73/504.14 |
| 2014/0305211 | A1 | 10/2014 | Malvern et al. |
| 2015/0241479 | A1 | 8/2015 | Koury, Jr. et al. |
| 2015/0308830 | A1 | 10/2015 | Su et al. |

FOREIGN PATENT DOCUMENTS

| CN | 101957200 B | 5/2012 |
| WO | WO 2006/124303 A1 | 11/2006 |

* cited by examiner

*Primary Examiner* — Xin Y Zhong
(74) *Attorney, Agent, or Firm* — Wolf, Greenfield & Sacks, P.C.

(57) ABSTRACT

A microelectromechanical systems (MEMS) sensor device with a compound folded tether is disclosed. The compound folded tether connects a movable proof mass to a substrate, and includes folds composed of multiple short segments aligned with each other to form a longer composite segment having multiple breaks along its length. The use of multiple short segments to create a longer composite segment of the folded tether provides the tether with increased stiffness without altering the fundamental resonance frequency of the tether. The increased stiffness can beneficially lower the occurrence of stiction. Moreover, such a tether configuration provides larger separation between the tether's fundamental resonance frequency and higher order resonant mode frequencies, meaning that the higher order modes may be suppressed in typical operation of the MEMS sensor device.

20 Claims, 7 Drawing Sheets

FOLDED TETHER STRUCTURE FOR MEMS SENSOR DEVICES

FIELD OF THE DISCLOSURE

The present application relates to tether structures used in microelectromechanical systems (MEMS) inertial devices.

BACKGROUND

Some microelectromechanical systems (MEMS) sensor devices include tethers connecting a resonator or movable proof mass to a substrate. The tethers provide a restoring force when the proof mass is displaced from its equilibrium. The tethers themselves exhibit a degree of stiffness, resisting motion of the movable proof mass. Tethers also can be characterized by their resonance frequencies, which can include a fundamental flexural mode frequency and a multitude of higher harmonic mode resonance frequencies.

THE SUMMARY OF THE DISCLOSURE

A microelectromechanical systems (MEMS) sensor device with a compound folded tether is disclosed. The compound folded tether connects a movable proof mass to a substrate, and includes folds composed of multiple short segments aligned with each other to form a longer composite segment having multiple breaks along its length. The use of multiple short segments to create a longer composite segment of the folded tether provides the tether with increased stiffness without altering the fundamental resonance frequency of the tether. The increased stiffness can beneficially lower the occurrence of stiction. Moreover, such a tether configuration provides larger separation between the tether's fundamental resonance frequency and higher order resonant mode frequencies, meaning that the higher order modes may be suppressed in typical operation of the MEMS sensor device.

According to some embodiments, a micro-electromechanical sensor apparatus is provided. The micro-electromechanical sensor apparatus comprises a substrate, a movable proof mass and a tether connecting the proof mass to the substrate. The tether includes a first row of multiple segments including a first segment defining a first lateral extent, a second row of multiple segments adjacent the first row of multiple segments and including second and third segments each having a length less than the first lateral extent and being aligned within the first lateral extent. The first segment of the first row is attached to the second and third segments of the second row by respective connecting segments.

According to some embodiments, a micro-electromechanical sensor apparatus is provided. The micro-electromechanical sensor apparatus comprises a substrate, a movable proof mass and a tether connecting the proof mass to the substrate. The tether includes a first row of multiple segments having breaks between them, and a second row of multiple segments having breaks between them. A break between first and second segments of the first row aligns with a break between first and second segments of the second row. The first segment of the first row is coupled to the first segment of the second row by a first connecting segment and the second segment of the first row is connected to the second segment of the second row by a second connecting segment.

According to some embodiments, an apparatus is provided, comprising a substrate, a proof mass and means for coupling the substrate to the proof mass.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear. In the drawings.

DETAILED DESCRIPTION

Aspects of the present application provide microelectromechanical systems (MEMS) devices having a compound folded tether coupling a movable proof mass to a substrate. One end of the tether is connected to the movable proof mass, and the other end of the tether is connected to the substrate. The tether is folded in that it has multiple folds between the two ends. Additionally, a given fold is formed by multiple relatively short segments spaced apart from and aligned with each other to form a longer segment of the fold. This construction of multiple relatively short segments aligned with each other to form a longer segment of the fold may provide a beneficial increase in tether stiffness with respect to certain types of deformation compared to a construction lacking such aligned, short segments. The increase in stiffness lowers the occurrence of the tether deforming so much during operation that it contacts and sticks to the substrate or other surrounding structures, a problem referred to as "stiction." Moreover, the tether may have substantially the same fundamental frequency as if the multiple, aligned short segments were instead a single, continuous segment defining the maximum lateral extent of the tether. At the same time, higher order modes of vibration of the tether may have frequencies differing significantly from the tether's fundamental frequency when multiple, aligned short segments are used instead of a single, longer segment. Thus, the higher order modes of vibration may be less likely to occur during operation of the MEMS device, improving device performance.

The compound folded tethers described herein may be used in a number of types of MEMS devices. For example, accelerometers, gyroscopes, and resonators may make use of such tethers according to aspects of the present application.

Figure 1:
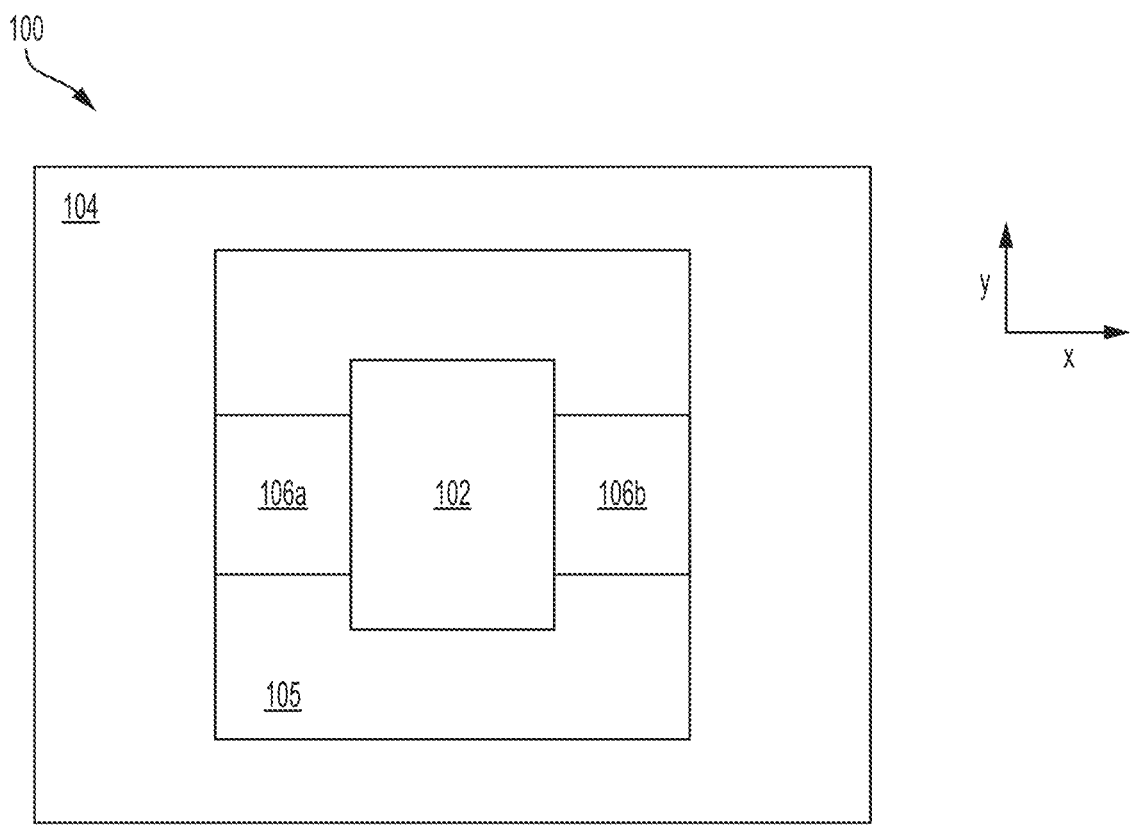
FIG. 1 is a high level, top-down view diagram representing a microelectromechanical systems (MEMS) sensor device having compound folded tethers coupling a proof mass to a substrate, according to an aspect of the present application.

FIG. 1 is a top-down view high level diagram representing a MEMS sensor device having compound tethers according to an aspect of the present application. In the diagram in FIG. 1, a MEMS sensor device 100 includes a movable proof mass 102 (also referred to herein as a "body") attached to substrate 104 (also referred to herein as a "reference frame" or a "support") with tethers 106a, 106b (also referred to herein as "couplers," "anchors," or "anchor tethers"). The tethers 106a and 106b suspend the movable proof mass 102 over a cavity 105, allowing the movable mass 102 to move in response to external electric and/or mechanical stimuli.

The proof mass 102 may be of any suitable size, shape, and material. As shown, in some embodiments the proof mass may be rectangular. In some embodiments, the proof mass 102 is a resonator.

Figure 2:
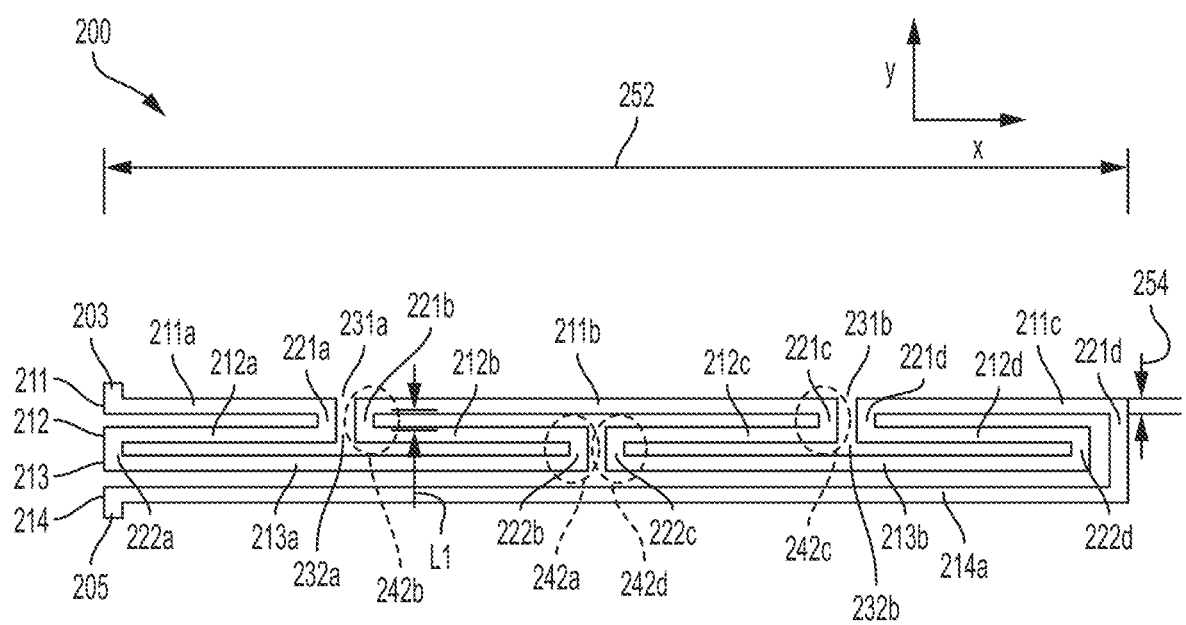
FIG. 2 is a schematic drawing illustrating a top view of an exemplary tether configuration in a MEMS device according to aspects of the present application.

Compound tethers 106 may be formed of any suitable material, and may be the same material as the movable proof mass 102 and/or the substrate 104. As an example, the tethers 106 may comprise polycrystalline silicon. The tethers 106a and 106b may be compound folded tethers including a plurality of folds, with at least one such fold being formed by a plurality of relatively short segments aligned with each other to form a longer segment having breaks along its length. The tethers 106a and 106b may include straight segments, meandering paths, zigzags, switchbacks, crosses, T-shaped structures, and combinations thereof. Examples will be described further below in connection with FIG. 2. As used herein, "switchback" refers to a generally C-shaped portion of a tether path including two substantially parallel segments connected by a third segment substantially orthogonal to the two connected segments. An example of a switchback component is shown in FIG. 2 and discussed in more detail below.

In some embodiments the compound tethers 106a and 106b may include multiple segments spanning the distance between the movable proof mass 102 and the substrate 104, the placement and dimension of each segment designed to provide a desired rigidity along one or more directions of the compound tether. Examples are described below in connection with FIG. 2.

Substrate 104 may be any suitable substrate, such as a silicon wafer, silicon die, or other semiconductor material. The cavity 105 may be formed in the substrate in any suitable manner, such as through lithography and etching processes.

Displacement or motion of the tethers 106a, 106b and the movable proof mass 102 relative to their respective rest positions may be in any direction (e.g., the x, y, and/or z directions). In some embodiments, it is desirable to excite and measure a motion of the movable proof mass 102 substantially within the x-y plane as shown in FIG. 1. For example, movable proof mass 102 may be excited to resonate at a resonance frequency with displacements in the y-direction. As the proof mass 102 moves in the y-direction, the tethers 106 and 106b may also move in the y-direction, for example by having the folds of the tethers expand and contract in the y-direction. A change of resonance characteristics of movable proof mass 102 during operation may be measured to represent a sensed characteristic of the MEMS sensor device. The sensed characteristic may be translational or rotational motion, acceleration, pressure, or any other typical mechanical characteristic that may be sensed using a resonator.

Although FIG. 1 shows that the movable proof mass 102 and tethers 106a, 106b are enclosed by the substrate 104 in the x-y plane, such an arrangement is not necessary. For example, in some alternative device designs, one or more resonator bodies may instead enclose a substrate. Although one substrate 104 is shown, any suitable number of substrates, movable proof masses and connecting tethers may be provided in a MEMS sensor device.

As has been described, any suitable MEMS substrate material, or combination of materials, may be used to form substrate 104. The movable proof mass 102 and tethers 106a, 106b may be formed of the same materials in some embodiments. An example is silicon. The substrate, proof mass, and tethers may be formed using standard MEMS and semiconductor fabrication techniques. In some embodiments, one or more components of substrate 104, movable proof mass 102 and tethers 106a, 106b may be of substantially the same thickness in a direction perpendicular to the x-y plane as shown in FIG. 1, although various aspects described herein are not limited in this respect.

The inventors have recognized that simple folded tethers formed by relatively long, equal length, parallel segments may suffer various drawbacks. For one thing, the fundamental resonance frequency of the tethers may be close to the resonance frequencies of higher order modes of vibration of the tethers. This means that, while it may be desirable for the tethers to move in a particular manner, for example expanding and contracting along the y-axis in FIG. 1 as the movable proof mass 102 moves along the y-axis, undesirable motion associated with higher order modes of vibration may occur, such as certain types of bending, twisting, and/or rotating of the tethers. The occurrence of higher order modes of vibration may negatively impact device performance.

Additionally, the inventors have recognized that a potential failure mode of a MEMS device having a proof mass coupled to a substrate by simple folded tethers formed by relatively long, equal length, parallel segments is stiction. The proof mass and/or tethers may become irreversibly stuck to another surface. This may occur, for example, when a large acceleration causes sufficiently large displacements in the movable proof mass 102 and/or portions of the tethers that they contact another surface, and when the attractive force between the surface and the displaced movable proof mass and/or tether is large enough to overcome the restoration force provided by the tethers.

Thus, aspects of the present application provide compound folded tethers. The compound folded tethers include, in at least some embodiments, a plurality of short segments along a direction of the fold to create a longer composite segment having breaks between the shorter segments. The compound folded tethers may provide increased transverse rigidity against orthogonal deflection, thereby increasing the resonance frequencies of higher order modes of vibration, may minimize the occurrence of stiction, and may avoid altering the fundamental resonance frequency compared to a simple folded tether.

As an example, the compound folded tethers 106a and 106b may each include a plurality of rows (e.g., oriented along the x-direction) with a plurality of short segments along one or more rows. By breaking up the maximum length of a tether segment along a single row into multiple short segments, the tether transverse rigidity in a direction orthogonal to the row direction (e.g., in the y-direction) is increased, alleviating the propensity for stiction. The multiple short segments in a single row maintain the overall maximum lateral extent of the tether (e.g., in the x-direction). According to an aspect, breaking up long single segment in a row into multiple short segments maintains a similar fundamental mode frequency as a tether having longer single-segment rows, while the higher order harmonic mode frequencies become higher. In some embodiments, multiple short segments in multiple rows (e.g., neighboring rows) are connected to segments in different rows by short connecting segments. In some embodiments, the compound tether comprises multiple "folded tether" segments. An example of a compound tether 106a and/or 106b according to an aspect of the present application is shown in FIG. 2.

FIG. 2 shows a top view of an exemplary tether 200 in a MEMS sensor device according to aspects of the current application. The tether 200 may represent an implementation of tether 106a and 106b, as an example, although tethers 106a and 106b may be implemented in other forms.

In FIG. 2, a tether 200 is shown disposed in the x-y plane with tether leads (also referred to herein as "ends") 203 and 205 that connect to a substrate and a movable proof mass, respectively (not shown). For example, lead 203 may connect to a movable proof mass and lead 205 to a substrate. Tether 200 has a maximum length 252 along the x-direction. Tether 200 includes a plurality of lateral rows 211-214 along the x-direction. Rows 211-213 further include multiple lateral segments. Row 211 includes segments 211a-211c. Row 212 includes segments 212a-212d. Row 213 includes segments 213a-213b. In this example, row 214 includes a single segment 214a with a length substantially the same as the maximum length 252. In some embodiments, the maximum length 252 may be less than 200 µm, less than 300 µm, between 10 and 50 µm, between 20 and 200 µm or between 50 and 300 µm, although it should be appreciated that any suitable maximum length may be used for the compound folded tether. The row segments may have lengths assuming any suitable value less than or equal to the maximum length 252.

Each segment of the multiple segments in a row defines a lateral extent of the segment. For example, segment 211b of the first row 211 defines a lateral extent that is smaller than the maximum lateral extent 252 of the tether 200. Segments 212b and 212c of the second row 212 are parallel and aligned under the first row segment 211b. Each of segments 212b and 212c has a length that is less than the lateral extent of segment 211b of the first row. In the illustrated example, row segments 212b and 212c are both aligned within the lateral extent of row segment 211b, in that segments 212b and 212c do not extend beyond the lateral extent of row segment 211b. As another example, row segments 212c and 212d are aligned within the lateral extent of row segment 213b. Likewise, row segments 212a and 212b are aligned within the lateral extent of row segment 213a.

The lateral segments in a row are connected to segments in adjacent rows by vertical connecting segments to form a serpentine or meandering path. Lateral segment 211b of the first row 211 is attached to lateral segments 212b and 212c of the second row 212 via connecting segments 221b and 221c, respectively. Each of the connecting segments 221b and 221c has a length L1 along the vertical y-direction that is shorter than a length of any of the lateral segments 211a-211c of the first row 211 in the x-direction. The vertical length of connecting segments between the first row 211 and second row 212 is representative of the vertical separation distance between the two connected rows.

In the tether 200 in FIG. 2, because the first row of lateral segments includes multiple segments each shorter than the maximum length 252 along the x-direction, multiple breaks are formed in the first row to break up the maximum length into multiple segments. For example, in the first row 211, the tether starts from lead 203, continues laterally to the right (in the x-direction) along segment 211a, before turning downward via connecting segment 221a to continue on towards the left along lateral segment 212a of the second row 212. This creates a break 231a separating segment 211a from 211b of the first row 211 Similarly, break 231b separates segment 211b from 211c of the first row 211. In the second row 212, break 232a separates segment 212a from 212b and break 232b separates segment 212c from 212d of the second row 212. Breaks 231a and 232a are aligned vertically to each other since the connecting segment 221a is substantially vertical, representing an essentially 90° turn where first row segment 211a is attached to second row segment 212a via connecting segment 221a.

Tether 200 also includes multiple switchback segments (or simply "switchbacks") such as 242a, 242b, 242c and 242d along its path. For example, in switchback segment 242a, lateral segment 213a of the third row 213 continues to the right and turns vertically upward to become vertical connecting segment 222b, which connects 213a with the second lateral segment 212b of the second row 212. The two lateral segments 213a and 212b joined by vertical connecting segment 222b form a switchback segment. Thus, the switchback segment makes a U-turn, or can be said to substantially assume a "C" shape, although other shapes are possible. Similarly, switchback segment 242b is where second row segment 212b continues along the path of the tether to become first row segment 211b; switchback segment 242c is where first row segment 212b continues along the path of the tether to become the third lateral segment 212c of the second row 212 and switchback segment 242d is where the third lateral segment 212c continues along the path of the tether to be connected to segment 213b of the third row, via connecting segment 222c.

Tether 200 is asymmetrical along any axis in the x-direction as the bottom row 214 has no break and the bottom row segment 214a spans the entire maximum length of the tether. Tether 200 is also asymmetrical along any axis in the y-direction as the two tether leads 203 and 205 are positioned on the same side of the tether, in this case the left side. However, it should be appreciated that any suitable position of the leads along the top row and bottom segments may be provided to connect to a movable proof mass and a substrate. In some embodiments, the leads may be on opposite sides of the tether. For example, the lead 203 may be on the left, as shown in FIG. 2, and the lead 205 may be on the right side of the tether.

Figure 3:
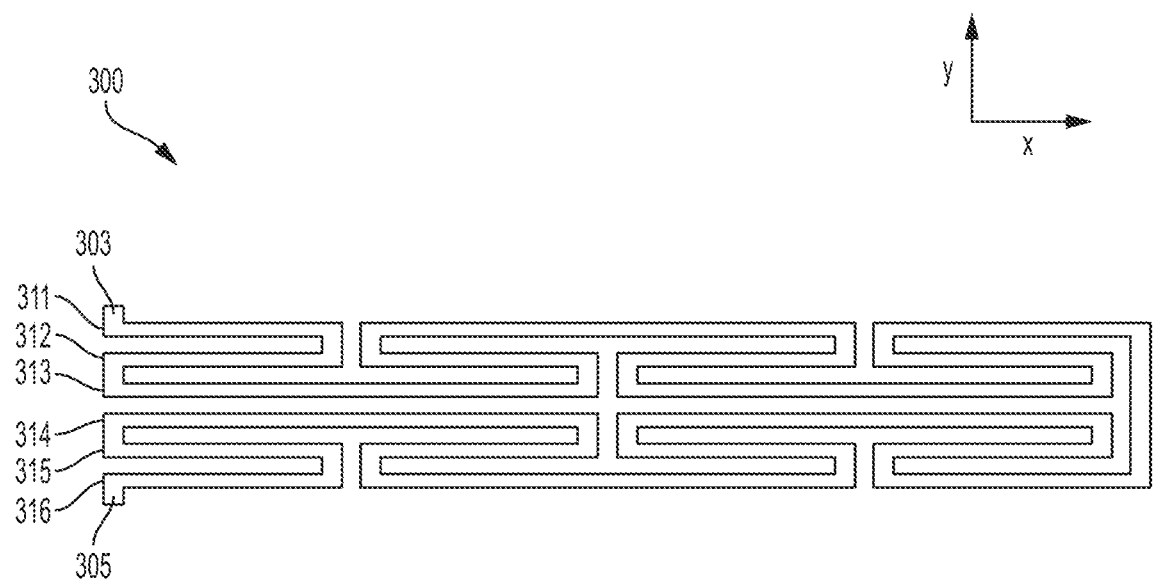
FIG. 3 is a schematic drawing illustrating a top view of another exemplary tether configuration in a MEMS sensor device according to an embodiment of the present application.
Figure 4:
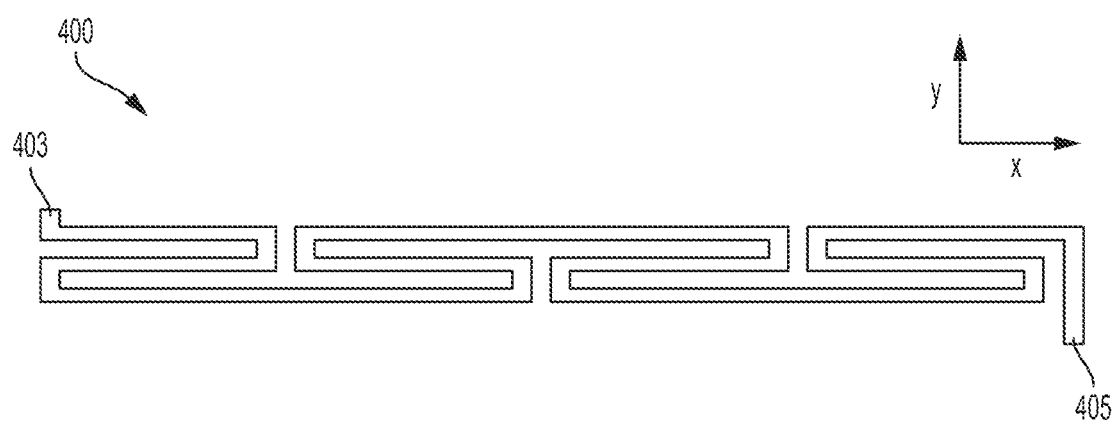
FIG. 4 is a schematic drawing illustrating a top view of another exemplary tether configuration in a MEMS sensor device according to an embodiment of the present application.

As used herein in the description of FIGS. 2-4, "lateral" and "vertical" refer to the x-axis and y-axis directions, respectively; "left" and "right" refer to the −x and +x directions, respectively; "up" and "down" refer to the +y and −y directions, respectively.

In the embodiment shown in FIG. 2, the tether segments of tether 200 may be of a uniform width 254, although not all embodiments are limited in this respect. Each segment may be configured to be a suitable width and within each segment, the width may differ at different portions to tune the mechanical characteristic of the tether. In some embodiments, the width 254 may be less than 40 µm, less than 20 µm, between 1 and 10 µm, between 1 and 30 µm, or between 2 and 20 µm, although it should be appreciated that any suitable width may be used.

Tether 200 may be used in a low-g MEMS sensor device to couple a movable proof mass with a substrate. According to an aspect of the present application, by aligning multiple short segments in a row to make up the maximum lateral extent 252 in the x-direction, the tether transverse rigidity in a direction orthogonal to the row direction is increased, alleviating the propensity for stiction. According to an aspect, forming a row, or fold, of the tether from multiple short segments may substantially maintain a similar fundamental mode frequency of the tether at the same value as would be realized if all rows were formed from single, longer segments, while the higher order harmonic mode frequencies become higher. In some embodiments, the multiple short segments in multiple rows are connected to segments in adjacent rows by vertical connecting segments. In this example, the tether 200 comprises multiple switchbacks that resemble "folded tether" segments. Thus, the tether 200 can be considered to have folds within folds.

FIG. 3 is a top down schematic drawing illustrating a top view of another tether configuration in a MEMS sensor device according to an embodiment of the present application. In FIG. 3, a tether 300 is shown disposed in the x-y plane with tether leads 303 and 305 that connect to a substrate and a movable proof mass, respectively (not shown). For example, lead 303 may connect to movable proof mass 102 in FIG. 1 and lead 305 to substrate 104 in FIG. 1. Tether 300 is, in many aspects, similar to tether 200. A difference between tether 300 and tether 200 is that tether 300 includes six lateral rows 311-316 along the x-direction. Rows 311 through 313 include multiple lateral segments and are configured in the same way as rows 211 through 213 of tether 200. Instead of a single segment 214a as in the fourth row 214 of tether 200, tether 300 further includes rows 314, 315 and 316 that each includes multiple lateral segments. Rows 314-316 are substantially similar to and mirror rows 411 through 413 along an axis in the x-direction. Thus, in this embodiment each of the rows of the tether is made up of multiple relatively short segments aligned to form a longer row.

Although six rows of segments are shown in the example in FIG. 3, it should be appreciated that any number of rows of segments may be used to configure the stiffness of the tether 300 against deflections in the y-direction or rotational deflections around tether leads 303 and/or 305. Tether 300 is configured to increase restoring force against displacements of the right end of the tether in the vertical direction and to increase the frequency separation between a fundamental mode and higher harmonic modes of the tether 300.

FIG. 4 is a schematic drawing illustrating a top view of yet another tether configuration in a MEMS sensor device according to an embodiment of the present application. In FIG. 4, a tether 400 is shown disposed in the x-y plane with tether leads 403 and 405 that connect to a substrate and a movable proof mass, respectively (not shown). Tether 400 is, in many aspects, similar to tether 200. A difference between tether 400 and tether 200 is that the tether leads 403 and 405 of tether 400 are disposed at different locations along the x-axis, allowing flexibility in coupling the substrate and the movable proof mass at different relative positions. It should be appreciated that although tether leads 403 and 405 are shown at the left and right ends of tether 400, alternative positions are possible. The tether leads may be placed along any position along the x-axis within the maximum lateral extent of the tether 400 to mechanically couple the substrate and the movable proof mass.

It should be appreciated that while tethers 200, 300 and 400 have four, six and three rows of segments, respectively, as shown in FIGS. 2-4, the compound folded tethers according to aspects of the present application may have any suitable number of rows of segments. In some embodiments, a compound folded tether with three or more rows of segments is provided. The total number of horizontal segments (m) in the first row or top row, the total number of horizontal segments (n) in the second row, and the total number of horizontal segments (k) in the third row of the folded tether may be given by the following relationship:

$$\begin{cases} k = m - 1 \\ n = k \cdot 2 \end{cases} \quad \text{(Eq. 1)}$$

For example, in the embodiments in FIGS. 2-4, tethers 200, 300 and 400 each have a total of m=3 horizontal segments in the first row, a total of n=4 horizontal segments in the second row and a total of k=2 horizontal segments in the third row, which satisfies Eq. 1 above. The relationship of Eq. 1 may be repeated for additional rows of the compound folded tether in some embodiments, such as that of FIG. 3. It should be appreciated that the embodiments shown in FIGS. 2-4 are provided as non-limiting examples only and although embodiments with m, n and k following the relationship described by Eq. 1 are discussed, not all embodiments of compound folded tethers according to aspects of the present application conform to Eq. 1.

Figure 5:
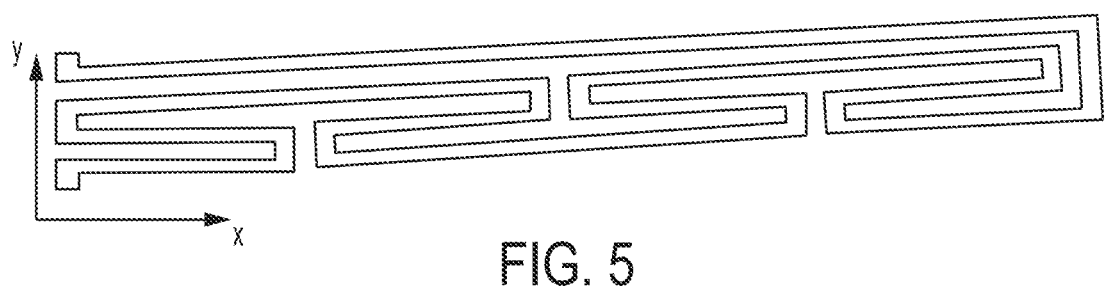
FIG. 5 shows simulation results of deformation and mode shape at the fundamental frequency for tether 200 of FIG. 2 with both tether leads fixed.

As has been described, tethers coupling a proof mass to a substrate may exhibit various modes of vibration. As an example, two modes of vibration are now shown for the tether 200. FIG. 5 provides simulation results illustrating the mode shape and amount of deformation of the tether 200 at the fundamental frequency (also referred to as mode 1) with both tether leads fixed. In the simulated plot in FIG. 5, the mode shape of the tether 200 is plotted where both tether leads on the left side are fixed. It should be appreciated that the deformed mode shape of the tether 200 is for illustrative purpose only and is not drawn to scale. The fundamental mode frequency is determined to be 72.3 kHz in this non-limiting example.

Figure 6:
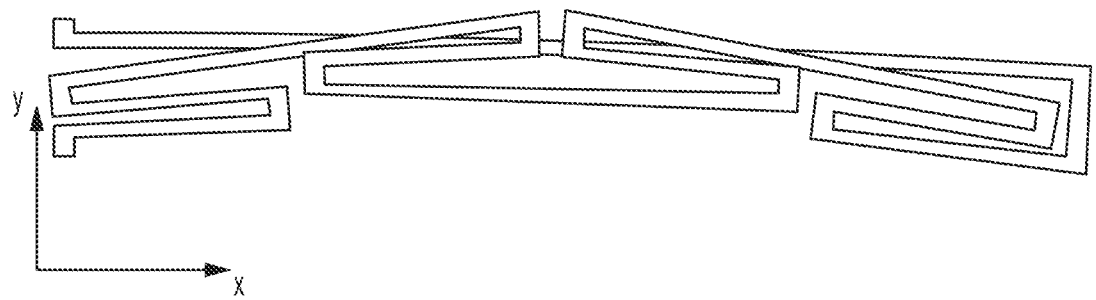
FIG. 6 shows simulation results of deformation and mode shape at the second harmonic mode for tether 200 of FIG. 2 with both tether leads fixed.

FIG. 6 provides simulation results illustrating the mode shape and amount of deformation of the tether 200 at the second harmonic mode (also referred to as mode 2) with both tether leads fixed. In the simulated plot in FIG. 6, the mode shape of the tether 200 is plotted where both tether leads on the left side are fixed. The lateral center of the tether 200 has a vertical (y-direction) deformation. It should be appreciated that the deformed mode shape of the tether 200 is for illustrative purpose only and is not drawn to scale. The resonance frequency of the second harmonic mode is determined to be 231.18 kHz in this non-limiting example, more than twice that of the fundamental mode frequency as determined from FIG. 5.

As has been described, compound folded tethers, such as those illustrated in FIGS. 2-4 may provide beneficial operating characteristics in terms of resonance frequencies. In at least some embodiments, the fundamental resonance frequency of such tethers is sufficiently offset from higher order mode resonance frequencies (including the closest higher order mode resonance frequency) in the frequency domain so that the higher order modes are unlikely to occur during typically operation of the MEMS device. To illustrate the point, Table 1 provided below shows a comparison of resonance frequencies from different harmonic modes based on simulation results for tether 200 and for a simple folded tether having the same maximum lateral extent as tether 200 but in which all the rows are formed by a single segment having a length equal to the maximum lateral extent. In this non-limiting example, the folded tether 200 has a uniform beam width of 2 μm, a maximum lateral extent of 200 μm and the length of a folded segment such as segment 211a as shown in FIG. 2 is 30 μm. However, it should be appreciated that any suitable dimensions may be used. For example, the uniform beam width may be 3 μm, 5 μm, between 2 and 3 μm or between 1 and 20 μm, while a folded segment of the plurality of segments may have a length of 40 μm, 50 μm, between 20 and 40 μm, between 30 and 50 μm, or between 10 and 100 microns. The maximum lateral extent of a tether may be 300 μm, 400 μm, 500 μm, between 80 and 300 μm or between 100 and 500 μm.

The results in Table 1 illustrate that the compound folded tether 200 exhibits a similar fundamental mode frequency as the simulated simple folded tether. Notably, though, the resonance frequencies for the second and higher harmonic modes of the compound folded tether 200 are significantly offset in the frequency domain from that of the fundamental mode. The compound folded tether 200 exhibits a higher mode resonance frequency that is more than twice (2×) that of the fundamental mode. In comparison, the frequency separation between the second mode and fundamental mode for the simple folded tether is much smaller.

TABLE 1

Comparison of resonance frequency (Hz) of various harmonic modes for two tether designs.

| Resonance frequency (Hz) | Simple Folded Tether | Tether 200 |
| --- | --- | --- |
| Mode 1 | 72299 | 72796 |
| Mode 2 | 101140 | 221180 |
| Mode 3 | 226020 | 360660 |
| Mode 4 | 445970 | 484940 |
| Mode 5 | 502120 | 578630 |
| Mode 6 | 619230 | 793520 |
| Mode 7 | 624440 | 800100 |
| Mode 8 | 666600 | 976210 |
| Mode 9 | 678350 | 1022100 |
| Mode 10 | 730510 | 1094400 |

Thus, compound folded tethers such as those described herein may provide a greater resonance frequency separation between the fundamental mode and higher order modes than that provided by simple folded tethers. Thus, MEMS devices implementing compound folded tethers will be less likely, in at least some embodiments, to experience the higher order modes during normal device operation, which may be beneficial for at least some applications.

Figure 7:
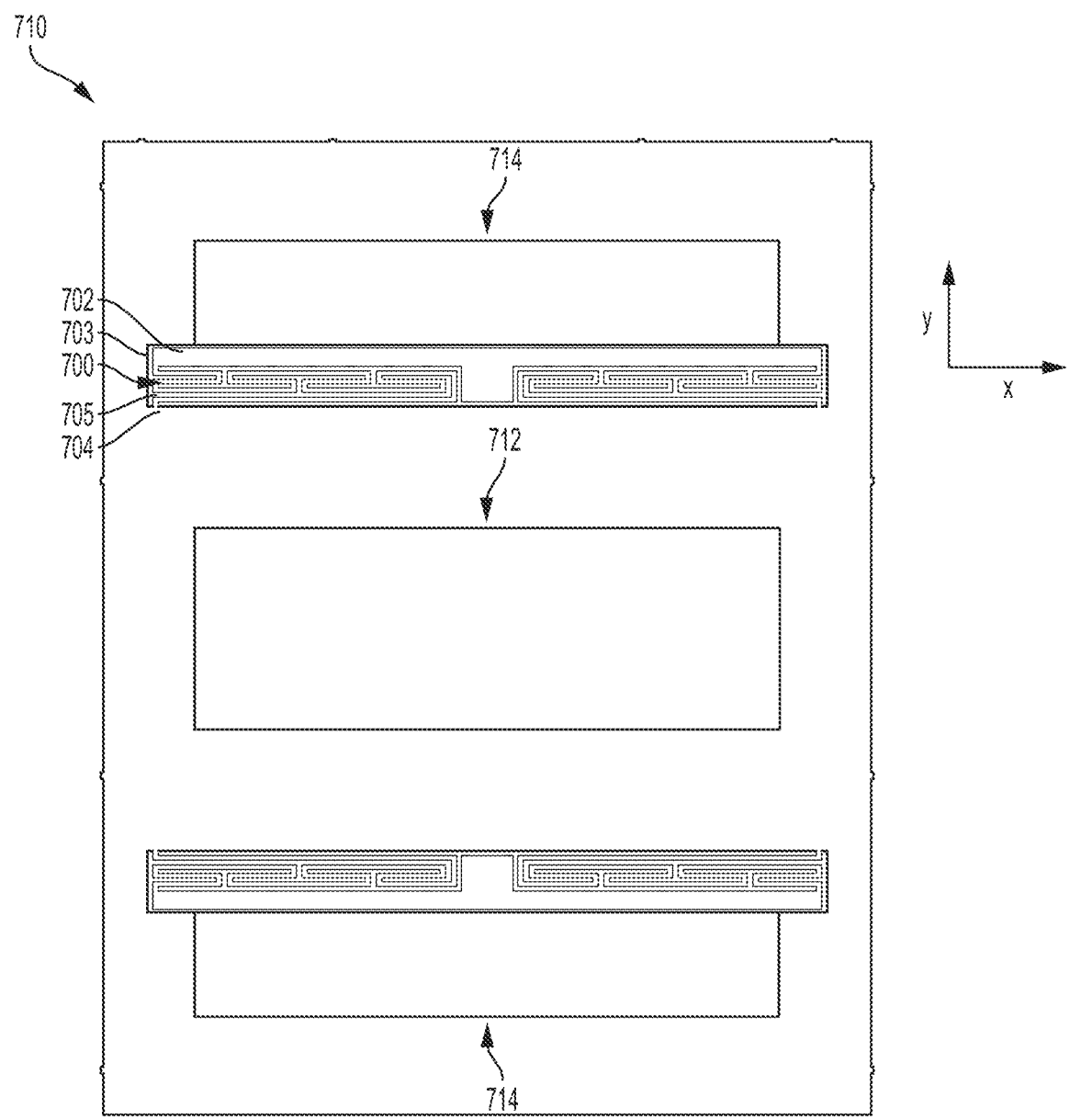
FIG. 7 is a schematic diagram showing a top view of a MEMS sensor device, according to an aspect of the present application.

FIG. 7 is a schematic diagram showing a top view of a MEMS sensor device 710 including compound folded tethers, according to an aspect of the present application. Device 710 includes a movable proof mass 704 configured to move in the plane of the page, in the up and down direction. The movable proof mass 704 is connected to substrate 702 via tether 700 at tether leads 703 and 705, respectively. Tether 700 is enclosed by movable proof mass 704 in the plane of the page. Device 710 also includes components 714 adjacent substrate 702 and components 712 enclosed by proof mass 704. Components 714 and 712 may be, for example, additional resonator structures such as movable fingers or electrodes (e.g., drive and/or sense electrodes), although these are non-limiting examples.

The tether 700 is a compound folded tether. In this non-limiting example, the tether 700 takes the form of tether 200 of FIG. 2. However, other forms of compound folded tethers may be used.

The MEMS sensor 710 may be an accelerometer configured to detect acceleration in the up-down direction in the plane of the page of FIG. 7. Alternatively, the MEMS sensor 710 may be a resonator. Other device types are possible.

Figure 8A:
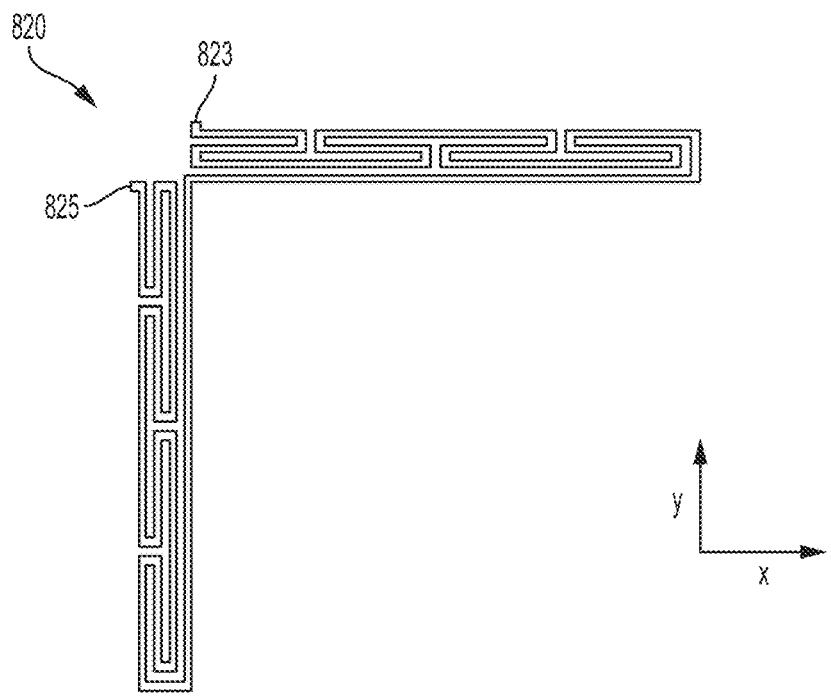
FIGS. 8A and 8B illustrate tethers configured to move in two dimension, according to non-limiting embodiments of the present application.
Figure 8B:
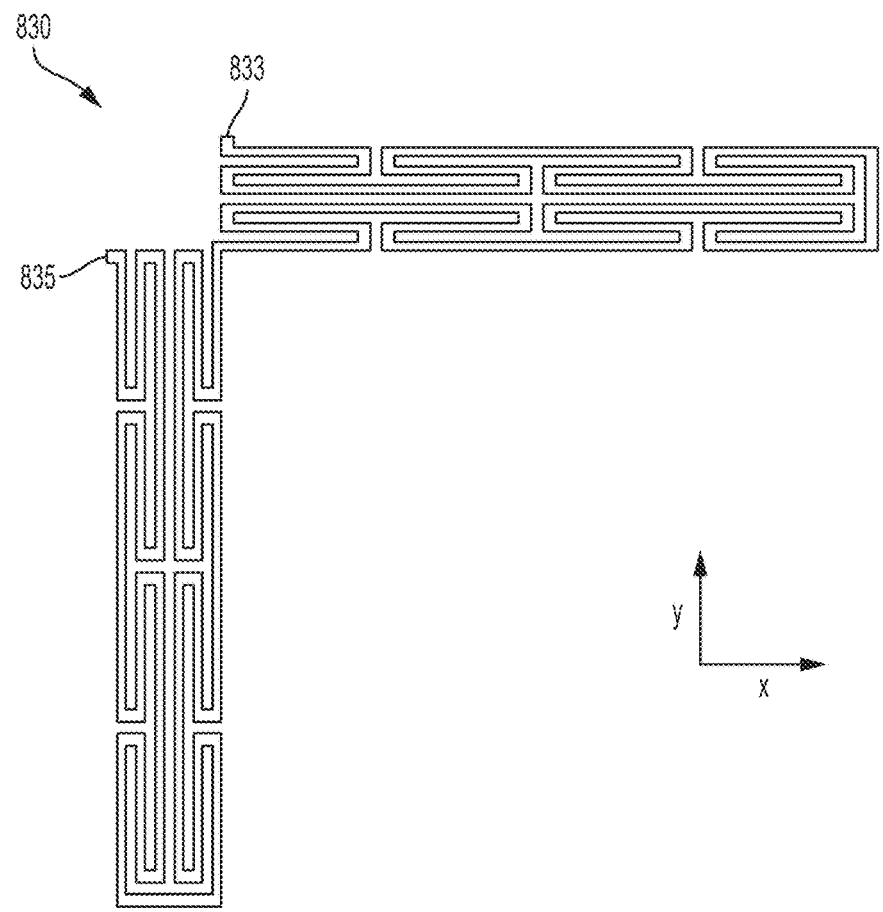

According to some embodiments, compound folded tethers may be configured to extend or contract in two dimensions. FIGS. 8A and 8B illustrate non-limiting examples. FIG. 8A is a schematic drawing illustrating a top view of a compound folded tether configuration in a MEMS sensor device according to an embodiment of the present application, including two instances of the tether 200 of FIG. 2. In FIG. 8A, a tether 820 is shown disposed in the x-y plane with tether leads 823 and 825 that connect to a substrate and a movable proof mass, respectively (not shown). Tether 820 has a first portion with tether lead 823 substantially elongated along the x-direction that is, in many respects, similar to tether 200. Tether 820 has a second portion with tether lead 825 that is, in many respects, similar to tether 200 rotated 90° in the x-y plane. Thus, tether 820 is a combination of two occurrences of tether 200 joined together, with the two occurrences being oriented in different directions of the x-y plane. Tether 820 may improve device performance for displacements of the movable proof mass along both x- and y-directions, such as by increasing the separations between a fundamental mode frequency and higher mode frequencies of the tether. It should be appreciated that although tether leads 823 and 825 are shown at the ends of tether 820 as shown in FIG. 8A, alternative positions are possible. The tether leads may be placed at any position to mechanically couple the substrate and the movable proof mass.

FIG. 8B illustrates an alternative to the compound folded tether 820 of FIG. 8B, which combines two occurrences of the tether 300 of FIG. 3. FIG. 8B is a top view. In FIG. 8B, a tether 830 is shown disposed in the x-y plane with tether leads 833 and 835 that connect to a substrate and a movable proof mass, respectively (not shown). Tether 830 has a first portion with tether lead 833 substantially elongated along the x-direction that is, in many respects, similar to tether 300. Tether 830 has a second portion with tether lead 835 that is, in many respects, similar to tether 300 rotated 90° in the x-y plane. Tether 830 is may provide improved device performance for displacements of the movable proof mass along both x- and y-directions, such as by increasing the separations between a fundamental mode frequency and higher mode frequencies of the tether. It should be appreciated that although tether leads 833 and 835 are shown at the ends of tether 830 as shown in FIG. 8A, alternative positions are possible.

Although FIGS. 8A and 8B provide two examples, other configurations of folded tethers configured to provide displacement in two dimensions are possible. Also, folded tethers of the types described herein may be extended to provide displacement in three dimensions.

MEMS devices implementing compound folded tethers of the types described herein may be deployed in various settings. For example, MEMS sensors may be used in sports, healthcare, military, and industrial applications, among others. Some non-limiting examples are now described.

Figure 9:
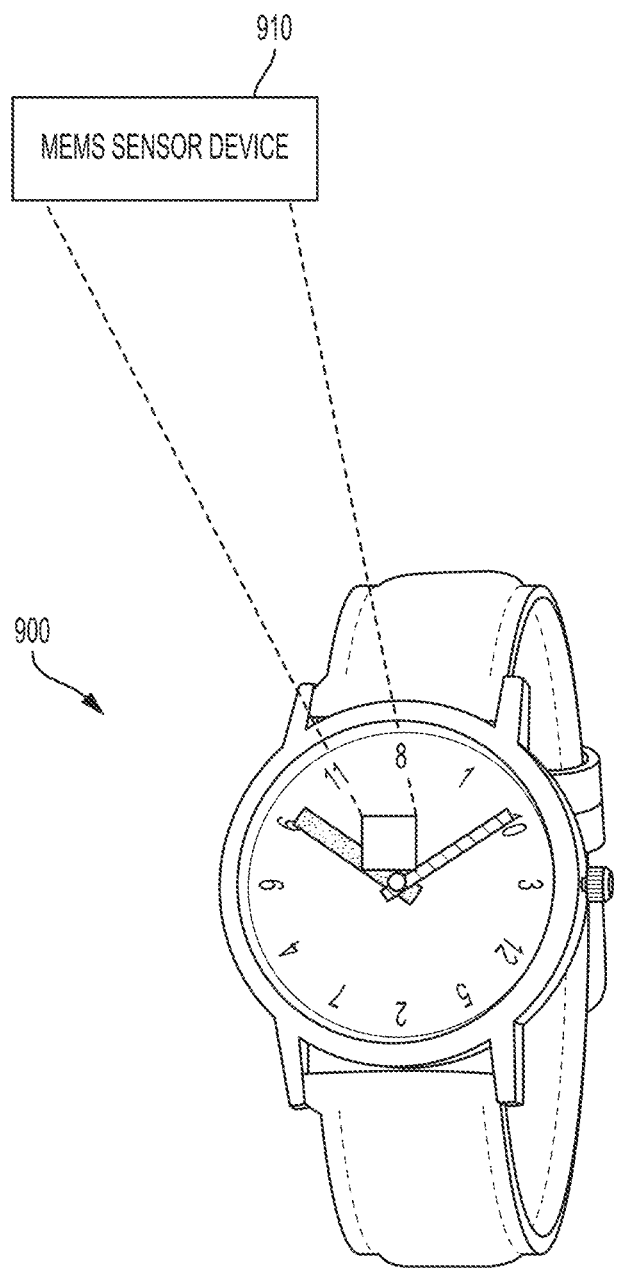
FIG. 9 is a schematic diagram of an electronic device that houses one or more MEMS sensor devices of the types described herein.

FIG. 9 is a schematic diagram of an electronic device 900 that houses one or more MEMS sensor device 910. According to an aspect of the present application, low-g MEMS sensor device 910 may be provided in consumer electronic devices such as the wearable electronic device 900 as shown in FIG. 8 to measure acceleration of the sensor device. In one example, wearable electronic device 900 is a smart wristwatch that measures a user's arm/hand movement. In another example, electronic device 900 may be an linear or rotational accelerometer or a gyroscopic inertial sensor used in a vehicle to track motion of the vehicle based on the low-g MEMS sensor device 910. Other uses are possible.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A micro-electromechanical sensor apparatus, comprising:
   a substrate;
   a movable proof mass; and
   a tether connecting the proof mass to the substrate, the tether including:
      a first row of multiple segments including a first segment defining a first lateral extent, and a second segment separated from the first segment by a gap;
      a second row of multiple segments adjacent the first row of multiple segments and including third and fourth segments each having a length less than the first lateral extent and being aligned within the first lateral extent, wherein the first segment of the first row is attached to the third and fourth segments of the second row by respective connecting segments.

2. The apparatus of claim 1, wherein the tether is substantially enclosed by the proof mass.

3. The apparatus of claim 1, wherein connecting segments of the tether connecting the first row of multiple segments to the second row of multiple segments are each shorter than all segments of the first and second rows of multiple segments.

4. The apparatus of claim 1, wherein the tether exhibits a maximum length substantially parallel to the first and second rows of multiple segments, and wherein the tether comprises a third row having a single segment of a length substantially equal to the maximum length.

5. The apparatus of claim 1, wherein the tether comprises at least three switchback segments including the third and fourth segments of the second row of multiple segments.

6. The apparatus of claim 1, wherein a resonance frequency of a second harmonic mode of the tether is more than twice a resonance frequency of the fundamental mode of the tether.

7. The apparatus of claim 1, wherein the tether connects the proof mass to the substrate such that the proof mass is configured to move along a direction substantially perpendicular to the first row of multiple segments.

8. The apparatus of claim 1, wherein the tether is asymmetric.

9. A micro-electromechanical sensor apparatus, comprising:
   a substrate;
   a movable proof mass; and
   a tether connecting the proof mass to the substrate, the tether including:
      a first row of multiple segments having gaps between them; and
      a second row of multiple segments having gaps between them,
      wherein a first gap between first and second segments of the first row aligns with a second gap between first and second segments of the second row, the first segment of the first row being coupled to the first segment of the second row by a first connecting segment and the second segment of the first row being connected to the second segment of the second row by a second connecting segment, and wherein the first row comprises a third gap between the second and a third segment of the first row.

10. The apparatus of claim 9, wherein the tether is substantially enclosed by the proof mass.

11. The apparatus of claim 9, wherein connecting segments of the tether connecting the first row of multiple segments to the second row of multiple segments are each shorter than all segments of the first and second rows of multiple segments.

12. The apparatus of claim 9, wherein the tether exhibits a maximum length substantially parallel to the first and second rows of multiple segments, and wherein the tether comprises a third row having a single segment of a length substantially equal to the maximum length.

13. The apparatus of claim 9, wherein the tether comprises at least three switchback segments including the first and second segments of the second row of multiple segments.

14. The apparatus of claim 9, wherein a resonance frequency of a second harmonic mode of the tether is more than twice a resonance frequency of the fundamental mode of the tether.

15. The apparatus of claim 9, wherein the tether connects the proof mass to the substrate such that the proof mass is configured to move along a direction substantially perpendicular to the first row of multiple segments.

16. The apparatus of claim 9, wherein the tether is asymmetric.

17. An apparatus, comprising:
    a substrate;
    a proof mass; and
    a folded tether coupling the substrate to the proof mass, the folded tether comprising:
       a first row having a first gap between a first and a second lateral segments of the first row and a second gap between the second and a third lateral segments of the first row;
       a second row having a third gap between a first and a second lateral segments of the second row, wherein
    the first gap aligns with the third gap, the first lateral segment of the first row being connected to the first lateral segment of the second row by a first switchback segment and the second lateral segment of the first row being connected to the second segment of the second row by a second switchback segment.

18. The apparatus of claim 17, wherein the folded tether comprises means for offsetting a resonance frequency of a fundamental mode of the tether from a resonance frequency of a second harmonic mode of the tether.

19. The apparatus of claim 18, wherein the means for offsetting a resonance frequency of a fundamental mode of the tether from a resonance frequency of a second harmonic mode of the tether comprises means for stiffening the tether in a direction substantially perpendicular to a direction of motion of the proof mass.

20. The apparatus of claim 17, wherein the folded tether is substantially enclosed by the proof mass.

\* \* \* \* \*